(12) United States Patent
Alfano et al.

(10) Patent No.: US 10,040,545 B2
(45) Date of Patent: Aug. 7, 2018

(54) ROTOR DOME, A ROTOR, AND A ROTORCRAFT

(71) Applicant: AIRBUS HELICOPTERS, Marignane (FR)

(72) Inventors: David Alfano, Aix en Provence (FR); Damien Desvigne, Aix en Provence (FR); Raphael Fukari, Le Rove (FR)

(73) Assignee: AIRBUS HELICOPTERS, Marignane (FR)

( * ) Notice: Subject to any disclaimer, the term of this patent is extended or adjusted under 35 U.S.C. 154(b) by 265 days.

(21) Appl. No.: 14/939,208

(22) Filed: Nov. 12, 2015

(65) Prior Publication Data
US 2016/0137297 A1 May 19, 2016

(30) Foreign Application Priority Data
Nov. 14, 2014 (FR) ..................................... 14 02558

(51) Int. Cl.
| | | |
|---|---|---|
| *B64C 7/00* | (2006.01) | |
| *B64C 27/32* | (2006.01) | |
| *B64C 27/00* | (2006.01) | |
| *B64C 27/04* | (2006.01) | |
| *B64C 11/14* | (2006.01) | |
| *B64C 11/02* | (2006.01) | |

(52) U.S. Cl.
CPC ............ *B64C 27/32* (2013.01); *B64C 27/001* (2013.01); *B64C 27/04* (2013.01); *B64C 7/00* (2013.01); *B64C 11/02* (2013.01); *B64C 11/14* (2013.01); *B64C 2027/003* (2013.01)

(58) Field of Classification Search
CPC ........... B64C 7/00; B64C 11/02; B64C 11/14; B64C 27/32; B64C 27/04; B64C 27/001; B64C 2027/003
See application file for complete search history.

(56) References Cited

U.S. PATENT DOCUMENTS

| | | | |
|---|---|---|---|
| 6,443,531 B1 | 9/2002 | Hogan et al. | |
| 8,287,243 B2* | 10/2012 | Herr | ........................ F03D 80/00 29/889 |
| 2009/0304511 A1* | 12/2009 | Brannon | ................... B64C 7/00 416/179 |

FOREIGN PATENT DOCUMENTS

| | | |
|---|---|---|
| EP | 2474469 | 7/2012 |
| EP | 2727832 | 5/2014 |

OTHER PUBLICATIONS

French Search Report for French Application No. FR 1402558, Completed by the French Patent Office dated Jul. 3, 2015, 6 pages.

(Continued)

*Primary Examiner* — Justin Seabe
*Assistant Examiner* — Behnoush Haghighian
(74) *Attorney, Agent, or Firm* — Brooks Kushman P.C.

(57) ABSTRACT

A dome for a rotor of a rotorcraft, the dome comprising a cap extending radially from an axis of rotation in elevation towards a periphery and in azimuth over 360 degrees, the cap extending in thickness from a bottom face for facing a hub of the rotor towards a top face above the bottom face. At least one of the top and bottom faces is an undulating face that undulates at least in azimuth between the periphery and the axis of rotation in elevation, by including in azimuth along at least one internal circle a succession of bulges and of recesses.

17 Claims, 3 Drawing Sheets

(56) References Cited

OTHER PUBLICATIONS

Notice of Preliminary Rejection for Korean Application No. 2015-0159616, dated May 15, 2017, 4 Pages.
Notice of Preliminary Rejection in Korean Application No. KR 2015-0159616; dated Nov. 28, 2017; 8 pages.

\* cited by examiner

ROTOR DOME, A ROTOR, AND A ROTORCRAFT

CROSS REFERENCE TO RELATED APPLICATION

This application claims priority to French patent application No. FR 14 02558 filed on Nov. 14, 2014, the disclosure of which is incorporated in its entirety by reference herein.

BACKGROUND OF THE INVENTION (1) Field of the Invention

The present invention relates to a dome for a rotorcraft lift rotor, and also to a rotorcraft provided with such a dome.

(2) Description of Related Art

A rotorcraft conventionally includes an airframe extending from a nose to a tail. The tail may comprise a tail boom carrying a tail fin and stabilizers.

The airframe may carry at least one rotor providing the rotorcraft with at least part of its lift, and possibly also with propulsion. Such a rotor is referred to below as a "lift rotor", and sometimes as a "main rotor" by the person skilled in the art.

The tail also includes a tail fin, sometimes carrying a rotor for controlling yaw movement of the rotorcraft. As a result, this rotor is sometimes referred to as a "tail rotor", given its location within the rotorcraft.

The airframe also has covers arranged under the main rotor. These covers may be movable covers serving to give access to a power plant, for example. Such covers are conventionally referred to as "engine covers".

While the rotorcraft is flying in translation, air flows along the rotorcraft. The slipstream of air downstream from the lift rotor and the covers of the airframe is generally disturbed. Such disturbances can then impact against a fin and/or a stabilizer at the tail of the rotorcraft.

This disturbed slipstream is commonly referred to as the "wake". This term is used below for reasons of convenience, even though it is not entirely appropriate. Specifically, in theory, a wake corresponds to a region downstream from an obstacle in a flowing fluid, with the fluid being at rest in that region relative to the obstacle.

The impact of the disturbances generated by a lift rotor on the tail of a rotorcraft can lead to one or more modes of vibration of the tail being excited aerodynamically, where such excitation is commonly referred to in aviation as "tail-shake". Such excitation presents numerous drawbacks, and in particular:

in terms of comfort for the crew and for passengers;
in terms of fatigue for parts and equipment; and
in terms of operation of certain systems of the rotorcraft.

Furthermore, the air flow can become separated locally from the airframe downstream from a lift rotor, and in particular downstream from the engine covers. Such separation tends to increase the magnitude of the aerodynamic excitation on the tail, and to enrich the frequency signature of such excitation.

In order to reduce such excitation, a dome may be arranged on the head of the lift rotor.

A dome is generally in the form substantially of a cap of an ellipsoid of revolution.

Furthermore, notches are arranged in a peripheral ring of the dome, in particular to avoid impeding the flapping and lead/lag movements of the blades.

Under such circumstances, a dome may comprise an ellipsoidal cap provided with one notch per blade of the rotor.

While flying in translation, this dome deflects the flow of air downstream from the lift rotor in a downward direction. The flow of air is then deflected mainly towards the covers and the tail boom, and no longer towards the stabilizer and the fin of the rotorcraft. The tail-shake effect is thus decreased.

Furthermore, a dome tends to deflect the slipstream downwards downstream from a lift rotor.

In addition, the dome tends to limit the extent to which a downstream slipstream becomes separated from engine covers.

Nevertheless, such domes do not always perform well.

A dome is generally dimensioned so as to deflect a slipstream downwards, and to minimize said separation of the slipstream downstream from the lift rotor carrying the dome. This dimensioning tends to determine the diameter of the dome.

Under such circumstances, the dome does not provide any means for acting on the frequency signature of the slipstream that is generated, nor does it provide means for acting on the forces to which the dome is subjected. A manufacturer therefore cannot act on a dome of given shape in order to solve problems of interactions between the slipstream and the dome.

Document EP 2 474 469 describes a dome having a cap.
Document EP 2 727 832 describes a rotor head.
Document U.S. Pat. No. 6,443,531 does not belong to the technical field of the invention and has no relationship with the invention, since its purpose is to provide decorative trim.

BRIEF SUMMARY OF THE INVENTION

An object of the present invention is thus to propose an alternative dome.

According to the invention, a dome is for a rotor of a rotorcraft, the dome comprising a cap extending radially from an axis of rotation in elevation towards a periphery and in azimuth over 360 degrees, the cap extending in thickness from a bottom face for facing a hub of the rotor towards a top face above the bottom face.

In addition, at least one of the top and bottom faces is an undulating face undulating at least in azimuth between the periphery and the axis of rotation in elevation, by including in azimuth along at least one internal circle a succession of bulges and of recesses facing an incident air stream so that the incident air stream impacts in succession against a bulge and a recess during rotation of the dome about the axis of rotation in elevation.

The dome serves to modify the flow of air by generating geometrical variations in the cap. The undulating shape of at least one of the top and bottom faces leads to geometrical variations in the dome that are discontinuous, both radially and in azimuth in decoupled manner.

Each undulating face describes movement along a circle going successively down and up. The presence of undulations thus makes it possible to generate bulges and recesses on the dome that face the incident air flow.

The presence of bulges and recesses serves to generate a pulsed flow. The incident air flow impacting the cap passes in succession over bulges and recesses, in particular because of the rotation of the dome.

The undulating shape of the dome in azimuth along at least one radius has the consequence of disturbing the incident air flow at the frequency at which it passes in succession over the bulges and recesses.

The dome of the invention thus generates turbulent flow structures that are generally of smaller size than the structures that naturally stem from a dome having faces that are regular. This wake interacts with the "natural" wake of the dome, and can potentially modify its frequency content because of the highly non-linear nature of interactions of this type. Consequently, the wake generated by the dome of the invention is pulsed.

This spectral redistribution of the overall wake from the dome can potentially lead to a reduction in the magnitude of the dynamic behavior of the wake. Specifically, a large fraction of the resulting turbulence presents dimensions that are smaller than with a standard dome. Such turbulence therefore naturally dissipates more quickly. The pulsed wake from the dome of the invention also makes it possible to act on potential separations of the air flow over the engine covers at frequencies higher than the frequency at which the blades go past, and that can reduce the magnitude of the wake that is generated.

In addition, the amplitudes of the forces and moments that are exerted on the means fastening the dome to the rotor tend to be reduced.

These frequencies can be adjusted by adapting the undulations, and thus without modifying the overall size of the dome.

Consequently, the invention can be used as a replacement for an existing dome.

The dome of the invention may also include one or more of the following characteristics.

For example, the top face of the dome may be an undulating face.

Furthermore, the undulating face may present a plurality of top edges and a plurality of bottom edges extending spanwise from the axis of rotation in elevation of the cap towards the periphery of the cap, each bottom edge being arranged in azimuth between two top edges, the top edges being contained in a non-undulating top geometrical surface above a non-undulating bottom geometrical surface containing the bottom edges, the undulating face undulating in azimuth between the non-undulating top geometrical surface and the non-undulating bottom geometrical surface.

The term "edge" is thus used to designate a geometrical line representing the top or the bottom of an undulation in the undulating face.

The non-undulating top geometrical surface and the non-undulating bottom geometrical surface may be caps of ellipsoids of revolution, for example.

Furthermore and optionally, said periphery need not be circular, but may be crenellated so as to define a succession of crenellations and of notches, each notch serving in particular to allow a blade to flap. The number of notches may be different from the number of top edges.

The number of top edges is selected as a function of the result intended by the manufacturer. The number of top edges may be completely independent of the number of notches.

Advantageously, the number of top edges is greater than the number of notches. In particular, the number of notches and the number of top edges may be mutually prime, for example.

Furthermore, the azimuth angle between two adjacent top edges need not be identical for all of the top edges.

Furthermore, the cap may have a reference non-undulating middle geometrical surface arranged between the bottom face and the top face. The cap presents a thickness in elevation between each undulating face and the reference non-undulating middle geometrical surface that varies at least in azimuth, the thickness varying continuously between a maximum thickness reached at each top edge and a minimum thickness reached at each bottom edge.

The thickness between the undulating face and the reference non-undulating middle geometrical surface may thus vary continuously in a radial direction.

Furthermore, the bottom face and the top face are optionally symmetrical about the reference non-undulating middle geometrical surface.

This type of dome is obtained by considering an azimuth modification to the thickness of the dome that is decoupled relative to the radial modification of the thickness between each undulating face and the non-undulating middle geometrical surface. The non-undulating middle geometrical surface is arranged between said bottom surface and said top surface and may present the form of a cap, possibly of an ellipsoid of revolution.

The thickness of the dome varies continuously between two values characterizing maximum thickness lines represented by top edges and minimum thickness lines represented by bottom edges. The variation in thickness for a given radial position relative to the axis of rotation in elevation and an azimuth position θ between two lines respectively of minimum and maximum thickness may be monotonic.

By way of example, this thickness may be determined by the following relationship:

$$e(r,\theta) = e_0 + f(r)g(\theta)$$

where $e(r,\theta)$ represents said thickness, $e_0$ is a constant representing a mean thickness, and $f(r)$ and $g(\theta)$ represent variation relationships of the thickness, respectively radially and in azimuth, between a reference non-undulating middle geometrical surface and an undulating face.

A manufacturer then determines the relationship for radial variation $f(r)$ and azimuth variation $g(\theta)$, e.g. by testing.

In addition, in a first embodiment, at least one of said top and bottom edges extends radially.

Optionally, each edge extends from the axis of rotation in elevation towards the periphery along a radius of the cap.

In a first variant of the first embodiment, said thickness varies linearly. This thickness may then optionally be determined by the following relationship between a given bottom edge and the given top edge that follows the given bottom edge:

$$e(r, \theta) = e_0 + \Delta e(r)\left(\frac{\theta - \theta_m}{\theta_M - \theta_m} - \frac{1}{2}\right)$$

where $e(r,\theta)$ represents said thickness, $e_0$ is a constant representing a mean thickness, $\Delta e$ represents a relationship giving a difference between a maximum thickness and a minimum thickness at a radial position "r", "θ" represents an azimuth position between said given bottom edge and said given top edge, "$\theta_m$" represents an azimuth position of said given bottom edge relative to a reference radius, and "$\theta_M$" represents an azimuth position of said given top edge relative to the reference radius.

Optionally, the relationship providing a difference between a maximum thickness and a minimum thickness at a radial position is a constant.

In a second variant of the first embodiment, said thickness varies in azimuth in sinusoidal manner. This thickness may then optionally be determined by the following relationship:

$$e(r, \theta) = e_0 + \Delta e(r) \frac{\sin\left[\pi\left(\frac{\theta - \theta_m}{\theta_M - \theta_m} - \frac{1}{2}\right)\right]}{2}$$

where e(r,θ) represents said thickness, $e_0$ is a constant representing a mean thickness, Δe represents a relationship giving a difference between a maximum thickness and a minimum thickness at a radial position "r", "θ" represents an azimuth position between said given bottom edge and said given top edge, "$\theta_m$" represents an azimuth position of said given bottom edge relative to a reference radius, and "$\theta_M$" represents an azimuth position of said given top edge relative to the reference radius.

Optionally, the relationship providing a difference between a maximum thickness and a minimum thickness at a radial position is a constant.

In a second embodiment, at least one of said edges does not extend along a radius of the cap.

For example, no edge extends in the dome along a radius of the dome.

Each edge then comprises a broken line or curve passing through the axis of rotation in elevation of the dome.

In particular, at least one edge is curved.

This variant consists in curving the edges along curves so they no longer extend along radii.

It is possible to envisage using curves that are not regular.

Nevertheless, at least one may present a convex shape that is convex in a direction of rotation of the dome.

In a first variant of the second embodiment, said thickness varies in azimuth in linear manner. By way of example, this thickness may be determined by the following relationship:

$$e(r, \theta) = e_0 + \Delta e(r)\left(\frac{\theta - \theta_m(r)}{\theta_M(r) - \theta_m(r)} - \frac{1}{2}\right)$$

where e(r,θ) represents said thickness, $e_0$ is a constant representing a mean thickness, Δe represents a relationship giving a difference between a maximum thickness and a minimum thickness at a radial position "r", "θ" represents an azimuth position between said given bottom edge and said given top edge, "$\theta_m(r)$" represents a relationship giving an azimuth position of said given bottom edge relative to a reference radius, and "$\theta_M(r)$" represents a relationship giving an azimuth position of said given top edge relative to the reference radius.

Optionally, the relationship providing a difference between a maximum thickness and a minimum thickness at a radial position is a constant.

The curvatures of two successive edges of minimum and maximum thickness are constructed from increasing functions of radial position r (convexity condition) that are piecewise-continuous. For any radial position, the azimuth position of a top edge is greater than the azimuth position of the preceding bottom edge, i.e.: $\theta_M(r) > \theta_m(r)$.

In a second variant of the second embodiment, said thickness varies in azimuth in sinusoidal manner. By way of example, this thickness may be determined by the following relationship:

$$e(r, \theta) = e_0 + \Delta e(r)\frac{\sin\left[\pi\left(\frac{\theta - \theta_m(r)}{\theta_M(r) - \theta_m(r)} - \frac{1}{2}\right)\right]}{2}$$

where e(r,θ) represents said thickness, $e_0$ is a constant representing a mean thickness, Δe represents a relationship giving a difference between a maximum thickness and a minimum thickness at a radial position "r", "θ" represents an azimuth position between said given bottom edge and said given top edge, "$\theta_m(r)$" represents a relationship giving an azimuth position of said given bottom edge relative to a reference radius, and "$\theta_M(r)$" represents a relationship giving an azimuth position of said given top edge relative to the reference radius.

Like the first variant, the curvatures of two successive edges of minimum and maximum thickness are constructed from increasing functions of radial position r (convexity condition), that are piecewise-continuous. For any radial position, the azimuth position of a top edge is greater than the azimuth position of the preceding bottom edge, i.e.: $\theta_M(r) > \theta_m(r)$.

This type of dome potentially serves to contribute to additional vortex generation in the wake from the dome, by means of the curvature of the edges, in order to tend to limit the direct impact of the wake that is generated on the tail fin.

A third embodiment may provide for arranging at least one edge that extends along a radius and at least one edge that does not extend along a radius.

Independently of the embodiment, at least one undulating face may present, in azimuth and along a circle situated at a given radius from the axis of rotation in elevation, a shape that is sinusoidal between a top edge and a bottom edge adjacent to the top edge.

In addition to a dome, the invention provides a rotorcraft rotor provided with a hub carrying a plurality of blades. The rotor then has a dome of the above-described type constrained to rotate with said hub, for example.

Furthermore, the invention provides a rotorcraft having at least one rotor of this type.

BRIEF DESCRIPTION OF THE SEVERAL
VIEWS OF THE DRAWINGS

The invention and its advantages appear in greater detail from the context of the following description of embodiments given by way of illustration and with reference to the accompanying figures, in which.

Elements present in more than one of the figures are given the same references in each of them.

DETAILED DESCRIPTION OF THE
INVENTION

The figures show three mutually orthogonal directions X, Y, and Z.

The direction X is said to be longitudinal. Another direction Y is said to be transverse. Finally, a third direction Z is said to be in elevation.

Figure 1:
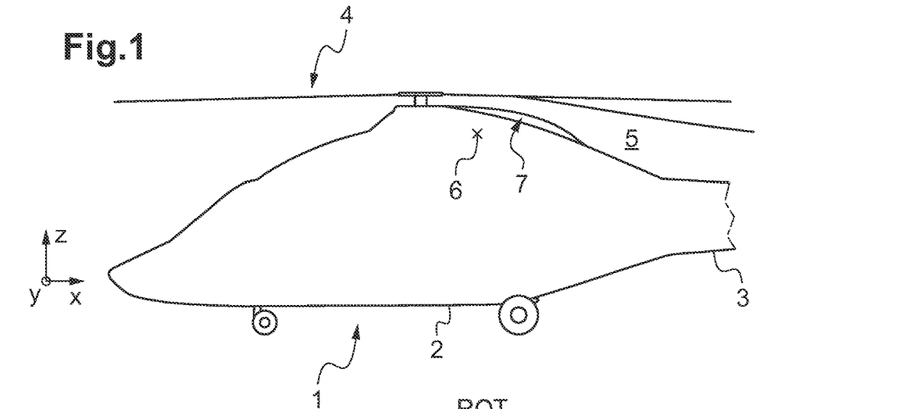
FIG. 1 is a view of a prior art rotorcraft without a dome.

FIG. 1 shows a prior art rotorcraft illustrating the problem of the invention.

The rotorcraft 1 is conventionally provided with an airframe extending from a nose to a tail and including a tail boom 3. The tail boom 3 may carry a tail fin, stabilizers, and possibly a rotor.

The airframe carries at least one main rotor 4 providing the rotorcraft with at least part of its lift and possibly also propulsion.

The wake 5 generated by the high portions of the rotorcraft and in particular its rotor 4 impacts against the tail of the aircraft, and in particular the tail fin and the stabilizers.

In addition, the wake 5 tends to separate from the airframe in a separation zone 7 that is situated in the proximity of engine covers 6.

Figure 2:
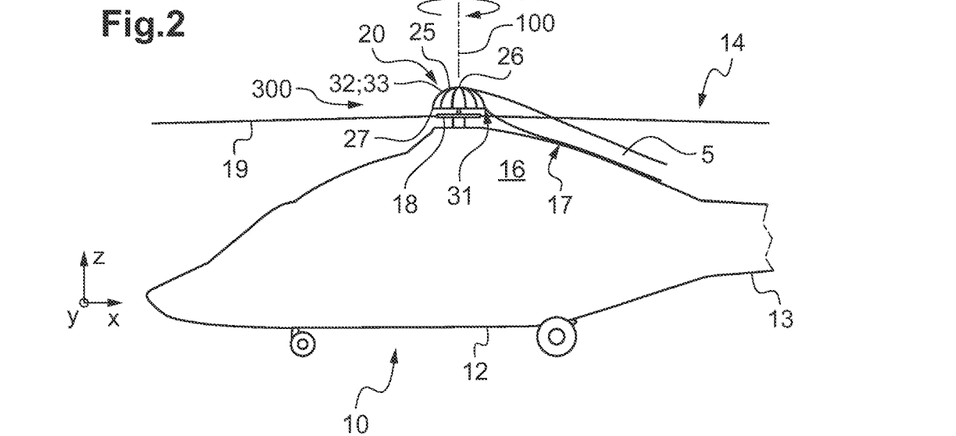
FIG. 2 is a view of a rotorcraft of the invention.

FIG. 2 shows a rotorcraft 10 of the present invention.

The rotorcraft 10 has an airframe extending from a nose to a tail and including a tail boom 13. The airframe carries at least one main rotor 14 providing the rotorcraft with at least part of its lift and possibly also propulsion. The rotor 14 has a hub 18 carrying a plurality of blades 19.

Furthermore, the rotor 4 has a dome 20 of the invention.

The dome has a cap 25. The cap 25 may for example be fastened to the hub 18 so as to be constrained to rotate with the main rotor 14.

The cap 25 extends radially from an axis of rotation 100 in elevation towards a periphery 27.

The cap 25 also extends in azimuth over 360 degrees. Furthermore, the cap 25 extends in elevation in its thickness direction from a bottom face 31 facing the hub 100 towards a top face 32. The centers 26 of each of the bottom and top faces 31 and 32 are then arranged on the axis of rotation 100 in elevation.

Furthermore, the bottom face 31 and/or the top face 32 is an undulating face 33 that undulates at least in azimuth.

Such an undulating face 33 is then sinuous, having a succession of depressions in azimuth forming recesses and of projections forming bulges.

The wake 5 generated by the top portions of the rotorcraft is then deflected downwards by the dome 20.

During rotation ROT of the dome about the axis of rotation 100 in elevation, an incident air stream 300 impacts in succession against a bulge and a recess.

The undulations of each undulating face then generate a pulsed wake. The pulsed wake generated by the dome 20 potentially leads to a reduction in the overall magnitude of the dynamic behavior of the wake 5 and tends at least to limit separation of the wake 5 in the separation zone 17 situated in the proximity of the engine covers 16.

Figure 3:
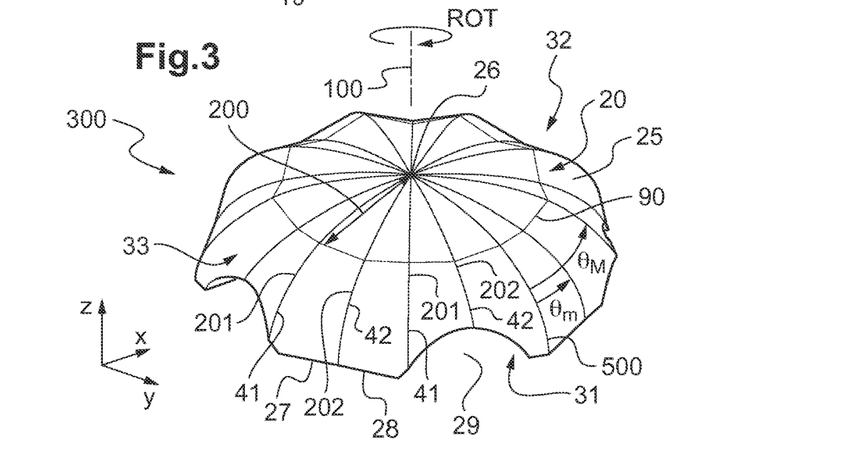
FIGS. 3 and 4 are respectively a view from above and a view from below of a dome having undulating faces including top and bottom edges extending along radii of the dome.

With reference to FIG. 3, the dome 20 is provided with a cap 25. The cap 25 thus extends radially from an axis of rotation 100 in elevation to a periphery 27.

The periphery 27 may be crenellated in order to define a succession of crenellations 28 and of notches 29. Each notch 29 is then arranged facing a blade so as to avoid interference between the blade and the cap as a result of flapping movements of the blade. By construction, each notch 29 is arranged between the periphery 27 and the axis of rotation 100 in elevation of the cap 25.

The cap 25 also has at least one undulating face 33. For example, the top face 32 of the cap 25 is an undulating face 33.

Figure 4:
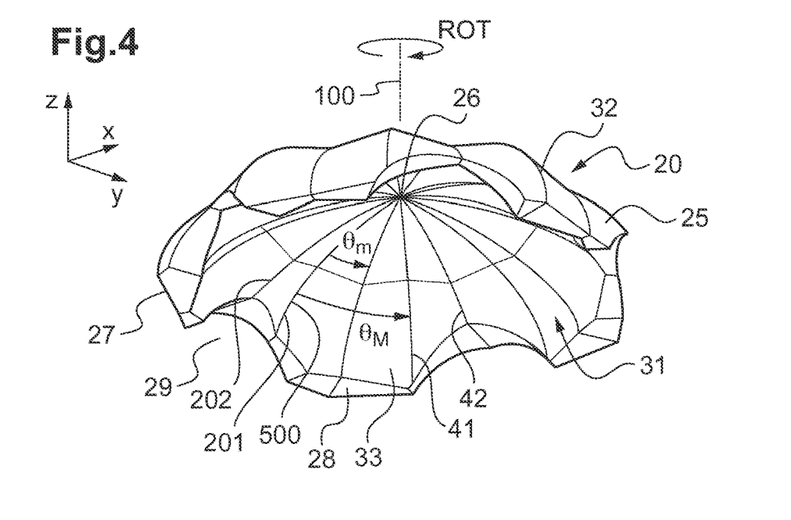

Nevertheless, and with reference to FIG. 4, the bottom face could be an undulating face 33, as an alternative or in addition.

With reference to FIG. 3, each undulating face presents a sinuous shape in azimuth.

This undulating face thus presents a plurality of top edges 41 and a plurality of bottom edges 42 that extend spanwise from the center 26 of the undulating face towards its periphery 27. By construction, each bottom edge 42 is arranged in azimuth between two top edges 41.

The undulating face then undulates in azimuth between two top edges 41 by passing via a bottom edge 42.

Relative to an incident air stream 300, the cap 25, while rotating, presents a succession of recesses 202 and of bulges 201 at least on an internal circle 90 that is geometrically situated at a radius 200 from the axis of rotation 100 in elevation. Each recess 202 is embodied by a bottom edge 42, each bulge 201 being embodied by a top edge 41. Because of the rotation ROT of the dome about the axis of rotation 100 in elevation, the incident air stream 300 thus impacts in succession against a recess and a projection.

In particular, the number of notches 29 may be different from the number of top edges 41. By way of example, the number of notches 29 and the number of top edges 41 may be mutually prime.

Figure 5:
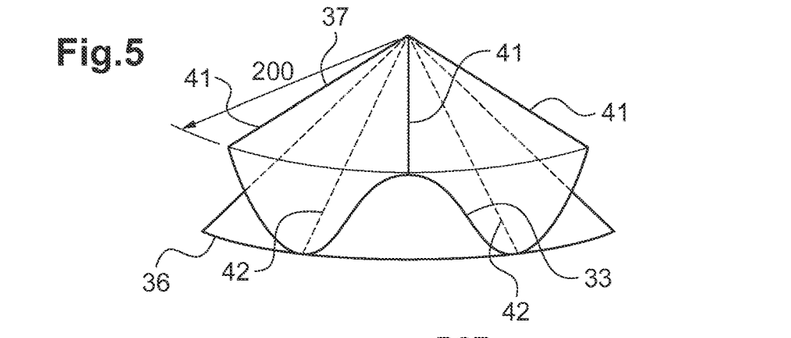
FIG. 5 is a diagram explaining how an undulating face is arranged between two non-undulating geometrical surfaces.

With reference to FIG. 5, the top edges 41 are contained in a non-undulating top geometrical surface 37, e.g. of conical shape. Likewise, the bottom edges 42 are contained in a non-undulating bottom geometrical surface 36, e.g. of conical shape.

Under such circumstances, the non-undulating top geometrical surface 37 is above the non-undulating bottom geometrical surface 36. Furthermore, the non-undulating top geometrical surface 37 and the non-undulating bottom geometrical surface 36 intersects at the center of the undulating face.

Consequently, the undulating face undulates in azimuth between the non-undulating top geometrical surface 37 and the non-undulating bottom geometrical surface 36.

Figure 6:
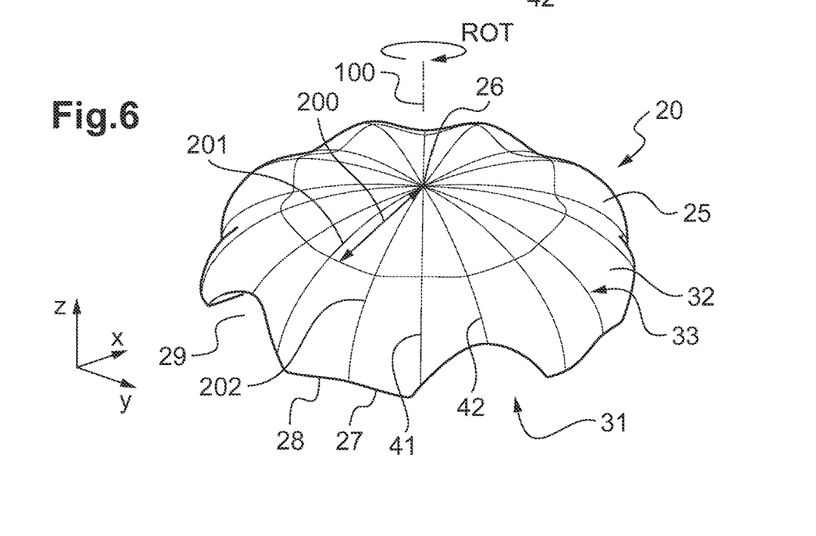
FIG. 6 is a view from above of a dome provided with undulating faces including sinusoidal portions between top and bottom edges extending along radii of the dome.

In particular, and with reference to FIGS. 5 and 6 for example, at least one undulating face presents a sinusoidal shape in azimuth along a circle situated at a given radius 200 from said axis of rotation 100 in elevation, the sinusoidal shape extending between a top edge 41 and a bottom edge 42 adjacent to the top edge 41.

Figure 7:
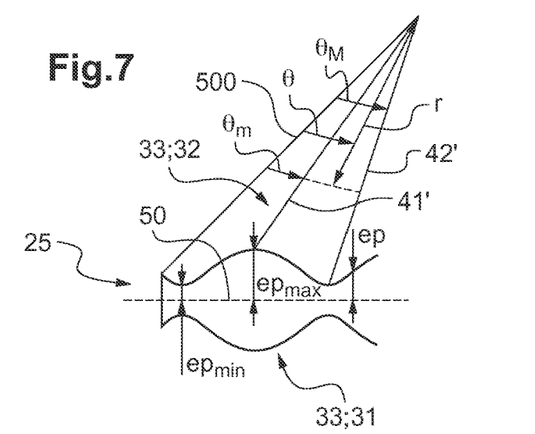
FIG. 7 is a diagram explaining how a cap is constructed by defining a thickness relationship relative to a reference geometrical surface.

With reference to FIG. 7, an undulating face may be obtained by modifying the thickness of the undulating face 33 relative to a reference non-undulating middle geometrical surface 50.

Such a reference non-undulating middle geometrical surface 50 may be in the form of a cap of an ellipsoid of revolution or in the form of a cone, for example.

In addition, the bottom face 31 and the top face 32 may comprise two undulating faces 33 arranged symmetrically on either side of the reference non-undulating middle geometrical surface 50.

Under such circumstances, the cap 25 presents thickness ep in elevation between each undulating face 33 and the reference non-undulating middle geometrical surface 50 that varies, at least in azimuth.

This thickness ep may for example vary continuously between a maximum thickness epmax reached in register with each top edge 41, and a minimum thickness epmin reached in register with each bottom edge 42.

Such a thickness is determined by the following relationship:

$$e(r,\theta) = e_0 + f(r)g(\theta)$$

where $e(r,\theta)$ represents said thickness, $e_0$ is a constant representing a mean thickness, and $f(r)$ and $g(\theta)$ represent variation relationships of the thickness, respectively radially and in azimuth, between a reference non-undulating middle geometrical surface and an undulating face.

The variation relationship in azimuth may provide a value for the thickness that is to be achieved at an azimuth position θ between a "given bottom" edge 42' and a "given top" edge 41' that is adjacent to the given bottom edge 42', this azimuth position θ being identified relative to a reference radius 500.

Furthermore, the relationship for variation in azimuth may provide said value as a function of the azimuth position $\theta_m$ of said given bottom edge 42 relative to the reference radius 500 and of the azimuth position $\theta_m$ of said given top edge 41 relative to the reference radius 500.

In the first embodiment shown in FIGS. 3, 4, and 6, at least one of said top and bottom edges 41 and 42 extends radially.

By way of example, all of the edges extend along radii of the cap.

In a first variant of the first embodiment, as shown in FIGS. 3 and 4, the thickness between an undulating face and a reference non-undulating middle geometrical surface 50 is determined by the following relationship between a given bottom edge 42 and a given top edge 41 following the given bottom edge 42:

$$e(r, \theta) = e_0 + \Delta e(r)\left(\frac{\theta - \theta_m}{\theta_M - \theta_m} - \frac{1}{2}\right)$$

where $e(r,\theta)$ represents said thickness, $e_0$ is a constant representing a mean thickness, $\Delta e$ represents a relationship giving a difference between a maximum thickness and a minimum thickness at a radial position "r", "θ" represents an azimuth position between said given bottom edge 42 and said given top edge 41, "$\theta_m$" represents an azimuth position of said given bottom edge 42 relative to a reference radius 500, and "$\theta_M$" represents an azimuth position of said given top edge 41 relative to the reference radius 500.

By way of example, the relationship Δe is a constant in the variant of FIGS. 3 and 4.

In a second variant of the first embodiment, as shown in FIG. 6, said thickness is determined by the following relationship between a given bottom edge 42 and a given top edge 41 following the given bottom edge 42:

$$e(r, \theta) = e_0 + \Delta e(r)\frac{\sin\left[\pi\left(\frac{\theta - \theta_m}{\theta_M - \theta_m} - \frac{1}{2}\right)\right]}{2}$$

where $e(r,\theta)$ represents said thickness, $e_0$ is a constant representing a mean thickness, Δe represents a relationship giving a difference between a maximum thickness and a minimum thickness at a radial position "r", "θ" represents an azimuth position between said given bottom edge 42 and said given top edge 41, "$\theta_m$" represents an azimuth position of said given bottom edge 42 relative to a reference radius 500, and "$\theta_M$" represents an azimuth position of said given top edge 41 relative to the reference radius 500.

Figure 8:
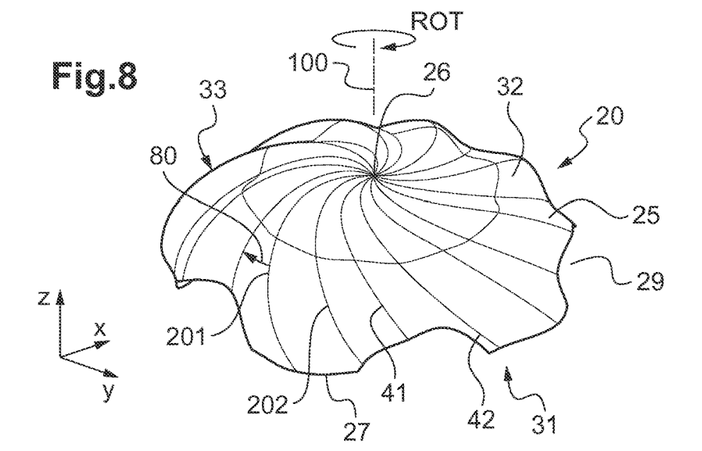
FIGS. 8 and 9 are views respectively from above and below of a dome provided with undulating faces including convex top and bottom edges.
Figure 9:
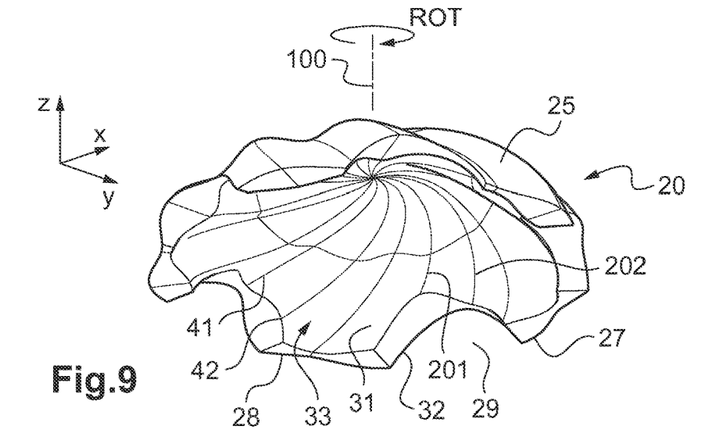

In a second embodiment shown in FIGS. 8 and 9, at least one of said top and bottom edges 41 and 42 does not extend along a radius of the cap 25.

For example, at least one edge 40 presents a convex shape that is convex pointing 80 in the direction of rotation ROT of the dome 20.

In a first variant of the second embodiment, as shown in FIG. 8, the thickness between an undulating face and a reference non-undulating middle geometrical surface 50 is determined by the following relationship between a given bottom edge 42 and a given top edge 41 following the given bottom edge 42:

$$e(r, \theta) = e_0 + \Delta e(r)\left(\frac{\theta - \theta_m(r)}{\theta_M(r) - \theta_m(r)} - \frac{1}{2}\right)$$

where $e(r,\theta)$ represents said thickness, $e_0$ is a constant representing a mean thickness, Δe represents a relationship giving a difference between a maximum thickness and a minimum thickness at a radial position "r", "θ" represents an azimuth position between said given bottom edge 42 and said given top edge 41, "$\theta_m(r)$" represents a relationship giving an azimuth position of said given bottom edge 42 relative to a reference radius 500, and "$\theta_M(r)$" represents a relationship giving an azimuth position of said given top edge 41 relative to the reference radius 500.

In a second variant of the second embodiment, as shown in FIG. 9, the thickness between an undulating face and a reference non-undulating middle geometrical surface 50 is determined by the following relationship between a given bottom edge 42 and a given top edge 41 following the given bottom edge 42:

$$e(r, \theta) = e_0 + \Delta e(r)\frac{\sin\left[\pi\left(\frac{\theta - \theta_m(r)}{\theta_M(r) - \theta_m(r)} - \frac{1}{2}\right)\right]}{2}$$

where $e(r,\theta)$ represents said thickness, $e_0$ is a constant representing a mean thickness, Δe represents a relationship giving a difference between a maximum thickness and a minimum thickness at a radial position "r", "θ" represents an azimuth position between said given bottom edge 42 and said given top edge 41, "$\theta_m(r)$" represents a relationship giving an azimuth position of said given bottom edge 42 relative to a reference radius 500, and "$\theta_M(r)$" represents a relationship giving an azimuth position of said given top edge 41 relative to the reference radius 500.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A dome for a rotor of a rotorcraft, the dome comprising:
  a cap extending radially and in an elevation direction from a center on an axis of rotation of the rotor towards a periphery of the cap, the periphery extending in an azimuth direction over 360 degrees, the cap extending in thickness from a bottom face for facing a hub of the rotor towards a top face above the bottom face, wherein at least one of the top and bottom faces is an undulating face undulating at least in the azimuth direction between the periphery and the axis of rotation by including in a succession of bulges and of recesses, wherein an incident air stream from the rotor impacts in succession against each of the bulges and recesses during rotation of the dome about the axis of rotation in elevation, wherein the undulating face has a plurality of top edges and a plurality of bottom edges extending away from the axis of rotation and in the elevation direction towards the periphery, each bottom edge being arranged in the azimuth direction between two top edges, the top edges defining a non-undulating top geometrical surface above a non-undulating bottom geometrical surface defined by the bottom edges, the undulating face undulating in the azimuth direction between the non-undulating top geometrical surface and the non-undulating bottom geometrical surface, wherein the cap has a reference non-undulating middle geometrical surface arranged between the bottom face and the top face, and the cap has a thickness in elevation between each undulating face and the reference non-undulating middle geometrical surface that varies at least in the azimuth direction, the thickness varying continuously between a maximum thickness reached at each top edge and a minimum thickness reached at each bottom edge.

2. The dome according to claim 1, wherein the top face is the undulating face.

3. The dome according to claim 1, wherein the bottom face and the top face are symmetrical about the reference non-undulating middle geometrical surface.

4. The dome according to claim 1, wherein at least one of the top and bottom edges extends radially.

5. The dome according to claim 1, wherein the thickness at any position along the cap is determined by the following relationship between a given bottom edge and the given top edge following the given bottom edge:

$$e(r, \theta) = e_0 + \Delta e(r)\left(\frac{\theta - \theta_m}{\theta_M - \theta_m} - \frac{1}{2}\right)$$

where $e(r,\theta)$ represents the thickness, $e_0$ is a constant representing a mean thickness, $\Delta e$ represents a relationship giving a difference between a maximum thickness and a minimum thickness at a radial position "r", "$\theta$" represents an azimuth position between the given bottom edge and the given top edge, "$\theta_m$" represents an azimuth position of the given bottom edge relative to a reference radius, and "$\theta_M$" represents an azimuth position of the given top edge relative to the reference radius.

6. The dome according to claim 1, wherein the thickness is determined at any position along the cap by the following relationship:

$$e(r, \theta) = e_0 + \Delta e(r)\frac{\sin\left[\pi\left(\frac{\theta - \theta_m}{\theta_M - \theta_m} - \frac{1}{2}\right)\right]}{2}$$

where $e(r,\theta)$ represents the thickness, $e_0$ is a constant representing a mean thickness, $\Delta e$ represents a relationship giving a difference between a maximum thickness and a minimum thickness at a radial position "r", "$\theta$" represents an azimuth position between the given bottom edge and the given top edge, "$\theta_m$" represents an azimuth position of the given bottom edge relative to a reference radius, and "$\theta_M$" represents an azimuth position of the given top edge relative to the reference radius.

7. The dome according to claim 1, wherein at least one of the top and bottom edges does not extend along a radius of the cap.

8. The dome according to claim 7, wherein at least one of the top and bottom edges has a convex shape that is convex pointing in a direction of rotation (ROT) of the dome.

9. The dome according to claim 1, wherein the thickness at any position along the cap is determined by the following relationship:

$$e(r, \theta) = e_0 + \Delta e(r)\left(\frac{\theta - \theta_m(r)}{\theta_M(r) - \theta_m(r)} - \frac{1}{2}\right)$$

where $e(r,\theta)$ represents the thickness, $e_0$ is a constant representing a mean thickness, $\Delta e$ represents a relationship giving a difference between a maximum thickness and a minimum thickness at a radial position "r", "$\theta$" represents an azimuth position between the given bottom edge and the given top edge, "$\theta_m(r)$" represents a relationship giving an azimuth position of the given bottom edge relative to a reference radius, and "$\theta_M(r)$" represents a relationship giving an azimuth position of the given top edge relative to the reference radius.

10. The dome according to claim 1, wherein the thickness at any position along the cap is determined by the following relationship:

$$e(r, \theta) = e_0 + \Delta e(r)\frac{\sin\left[\pi\left(\frac{\theta - \theta_m(r)}{\theta_M(r) - \theta_m(r)} - \frac{1}{2}\right)\right]}{2}$$

where $e(r,\theta)$ represents the thickness, $e_0$ is a constant representing a mean thickness, $\Delta e$ represents a relationship giving a difference between a maximum thickness and a minimum thickness at a radial position "r", "$\theta$" represents an azimuth position between the given bottom edge and the given top edge, "$\theta_m(r)$" represents a relationship giving an azimuth position of the given bottom edge relative to a reference radius, and "$\theta_M(r)$" represents a relationship giving an azimuth position of the given top edge relative to the reference radius.

11. The dome according to claim 1, wherein at least one undulating face has, in the azimuth direction and along a circle situated at a given radius from the axis of rotation in elevation, a shape that is sinusoidal between a top edge and a bottom edge adjacent to the top edge.

12. The dome according to claim 1, wherein the periphery is not circular but is crenellated so as to define a succession of crenellations and of notches, each notch allowing a blade to flap, the number of notches being different from the number of top edges.

13. The dome according to claim 12, wherein the number of notches and the number of top edges are mutually prime.

14. A rotorcraft rotor having a hub carrying a plurality of blades, wherein the rotor includes a dome according to claim 1.

15. A rotorcraft, including at least one rotor according to claim 14.

16. A dome for a rotor of a rotorcraft, the dome comprising:
- a cap mounted at a center on an axis of rotation of the rotor, the cap having a succession of bulges and of recesses, wherein each of the bulges and recess extends away from the center in a radial direction and an elevation direction to a periphery of the cap to define an undulating surface in an azimuth direction over 360 degrees,
- wherein an incident air stream from the rotor impacts in succession against each of the bulges and recesses during rotation of the dome about the axis of rotation in elevation, thereby generating a pulsed wake,
- wherein a thickness of the cap varies between a maximum thickness at each of the bulges and a minimum thickness at each of the recesses.

17. A dome for a rotor of a rotorcraft, the dome comprising:
- a cap extending radially in an elevation direction from a center on an axis of rotation of the rotor towards a periphery of the cap, the periphery extending in an azimuth direction over 360 degrees, the cap extending in thickness from a bottom face for facing a hub of the rotor towards a top face above the bottom face, wherein at least one of the top and bottom faces is an undulating face undulating at least in the azimuth direction between the periphery and the axis of rotation by including in a succession of bulges and of recesses,
- wherein an incident air stream from the rotor impacts in succession against each of the bulges and recesses during rotation of the dome about the axis of rotation in elevation,
- wherein the undulating face has a plurality of top edges and a plurality of bottom edges extending away from the axis of rotation and in the elevation direction towards the periphery, each bottom edge being arranged in the azimuth direction between two top edges, the top edges defining a non-undulating top geometrical surface above a non-undulating bottom geometrical surface defined by the bottom edges, the undulating face undulating in the azimuth direction between the non-undulating top geometrical surface and the non-undulating bottom geometrical surface, wherein the cap has a reference non-undulating middle geometrical surface arranged between the bottom face and the top face, and the cap has a thickness in elevation between each undulating face and the reference non-undulating middle geometrical surface that varies at least in the azimuth direction, the thickness varying continuously between a maximum thickness reached at each top edge and a minimum thickness reached at each bottom, wherein the thickness at any position along the cap is determined by the following relationship:

$$e(r,\theta) = e_0 + f(r)g(\theta)$$

where $e(r,\theta)$ represents the thickness, $e_0$ is a constant representing a mean thickness, and $f(r)$ and $g(\theta)$ represent variation relationships of the thickness, respectively radially and in the azimuth direction, between a reference non-undulating middle geometrical surface and an undulating face.

* * * * *